United States Patent
Gondoh et al.

(10) Patent No.: US 10,106,340 B2
(45) Date of Patent: Oct. 23, 2018

(54) ARTICLE LOADING FACILITY

(71) Applicant: Daifuku Co., Ltd., Osaka-shi (JP)

(72) Inventors: Takuya Gondoh, Tokyo (JP); Shigeru Sugano, Hinocho (JP); Atsushi Kurayama, Tokyo (JP); Masami Iwai, Tokyo (JP); Atsushi Minoo, Tokyo (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/696,709

(22) Filed: Sep. 6, 2017

(65) Prior Publication Data
US 2018/0065819 A1   Mar. 8, 2018

(30) Foreign Application Priority Data
Sep. 7, 2016   (JP) .................................. 2016-174928

(51) Int. Cl.
*B65G 57/22*   (2006.01)
*B65G 57/16*   (2006.01)
(Continued)

(52) U.S. Cl.
CPC ............. *B65G 61/00* (2013.01); *B65G 57/16* (2013.01); *B65G 57/22* (2013.01); *B65G 60/00* (2013.01); *B65G 65/005* (2013.01)

(58) Field of Classification Search
CPC .................................. B65G 57/22; B65G 57/16
See application file for complete search history.

(56) References Cited

U.S. PATENT DOCUMENTS 3,586,176 A * 6/1971 Rackman .................. B25J 9/026
  414/792
3,850,313 A * 11/1974 Rackman ................. B65G 57/22
  414/591

(Continued)

FOREIGN PATENT DOCUMENTS

JP             201540120 A         3/2015

*Primary Examiner* — Thomas Randazzo
(74) *Attorney, Agent, or Firm* — The Webb Law Firm (57) ABSTRACT

A control unit performs a first loading control and a second loading control. The first loading control is performed to control a loading operation unit to load a plurality of target articles onto a first supporting member according to arrangement information. The second loading control is performed to execute a second determination process based on at least one of: the arrangement information; detection information obtained by the detection unit; and information regarding a loading area, to determine whether or not the remaining articles are loadable onto the first supporting member, and to control the loading operation unit to load the remaining articles onto the first supporting member if the remaining articles are determined as being loadable in the second determination process. While performing the first loading control, if the control unit does not determine in the first determination process that the target articles are in a different state, the control unit continues performing the first loading control, and while performing the first loading control, if the control unit determines in the first determination process that the target articles are in the different state, the control unit performs the second loading control instead of the first loading control.

10 Claims, 7 Drawing Sheets

(51) Int. Cl.
 *B65G 61/00* (2006.01)
 *B65G 65/00* (2006.01)
 *B65G 60/00* (2006.01)

(56) References Cited

U.S. PATENT DOCUMENTS

| | | | | |
|---|---|---|---|---|
| 4,692,876 | A * | 9/1987 | Tenma | B65G 1/1371 414/791.6 |
| 9,828,128 | B1 * | 11/2017 | Linnell | B65B 59/02 |
| 2010/0178149 | A1 * | 7/2010 | Fritzsche | B65G 57/22 414/789.5 |
| 2015/0073588 | A1 * | 3/2015 | Priebe | B65G 57/26 700/217 |

* cited by examiner

ARTICLE LOADING FACILITY

CROSS-REFERENCE TO RELATED APPLICATION

This application claims priority to Japanese Patent Application No. 2016-174928 filed Sep. 7, 2016, the disclosure of which is hereby incorporated in its entirety by reference.

BACKGROUND OF THE INVENTION

Field of the Invention

The present invention relates to an article loading facility that includes: a loading operation unit that performs an operation to load a plurality of target articles onto one first supporting member; and a control unit that controls the loading operation unit, wherein the control unit performs a first loading control to control the loading operation unit so that the plurality of target articles are loaded onto the first supporting member according to arrangement information that indicates the orientation and the position of each of the plurality of target articles on the first supporting member.

Description of the Related Art

An example of the above-described article loading facility is disclosed in JP 2015-040120A (Patent Document 1). In the article loading facility disclosed in Patent Document 1, one target article that is supported by a transport conveyor is taken out by a transfer robot, the target article thus taken out is loaded onto a cage cart (the first supporting member) according to an arrangement that is indicated by arrangement information, and thus a plurality of target articles are loaded onto the cage cart (the first supporting member) one by one according to the arrangement information.

SUMMARY OF THE INVENTION

With the article loading facility disclosed in the above-described Patent Document 1, there is the possibility of articles that have been loaded onto the first supporting member being not arranged according to the arrangement indicated by the arrangement information due to the orientations of the articles that have been loaded onto the cage cart by the transfer robot having been lost. If the orientations of the articles on the first supporting member have been lost, there are cases where the target articles thereafter cannot be loaded onto the cage cart according to the arrangement information. If target articles cannot be loaded onto the cage cart according to the arrangement information, loading control is interrupted. Therefore, there are cases where a plurality of target articles cannot be smoothly loaded onto the first supporting member.

Therefore, there is demand for an article loading facility that can continuously load target articles onto the first supporting member even when the positions or orientations of target articles that have been loaded onto the first supporting member are different from those indicated by arrangement information, and can smoothly load all of the plurality of target articles onto the first supporting member.

An article loading facility according to the present disclosure includes: a loading operation unit that loads a plurality of target articles onto one first supporting member; and a control unit that controls the loading operation unit, wherein the control unit performs a first loading control to control the loading operation unit so that the plurality of target articles are loaded onto the first supporting member according to arrangement information that indicates the orientation and the position of each of the plurality of target articles on the first supporting member, the loading operation unit takes out a target article that is supported by the second supporting member, and loads the target article onto the first supporting member, the article loading facility further includes: a detection unit that detects the positions and the orientations of the target articles that are supported by the first supporting member, relative to the first supporting member; and a determination unit that performs a first determination process while the first loading control is performed, to determine whether or not the target articles are in a different state in which the articles are not loaded onto the first supporting member according to the arrangement indicated by the arrangement information, based on detection information obtained by the detection unit, the determination unit executes the first determination process each time a target article is loaded onto the first supporting member, when the target articles are determined as being in the different state in the first determination process, articles that are not loaded on the first supporting member, out of the target articles, are determined as remaining articles, after the first loading control has been completed, the control unit repeatedly performs the first loading control if the determination unit has not determined in the first determination process that the target articles are in the different state, while the first loading control is performed, if the determination unit determines in the first determination process that the target articles are in the different state, the control unit performs a second loading control instead of the first loading control, and the second loading control is control that is performed to execute a second determination process based on at least one of: the arrangement information; detection information obtained by the detection unit; and information regarding a loading area of the first supporting member in which articles are loadable, to determine whether or not the remaining articles are loadable onto the first supporting member, and to control the loading operation unit to load the remaining articles onto the first supporting member if the remaining articles are determined as being loadable in the second determination process.

With this configuration, the control unit continuously performs the first loading control and hence a plurality of target articles can be loaded onto the first supporting member according to the arrangement information. However, there are cases where the target articles are not loaded onto the first supporting member according to the arrangement information due to, for example, a target article that has been loaded onto the first supporting member falling down when some of the plurality of target articles that are to be loaded onto the first supporting member have been loaded onto the first supporting member. In such cases, the second loading control is performed instead of the first loading control.

In the second loading control, whether or not the remaining articles are loadable onto the first supporting member is determined based on at least one of: the arrangement information, detection information obtained by the detection unit; and information regarding a loading area of the first supporting member in which articles are loadable, and the loading operation unit is controlled to load the remaining articles onto the first supporting member if the remaining articles are determined as being loadable. That is, even in a case where the target articles are not loaded onto the first supporting member according to the arrangement indicated by the arrangement information, if it is determined that articles can be loaded onto the first supporting member, for example, if there is a sufficient space on the first supporting member so that the remaining articles can be loaded thereon, the loading operation unit loads the remaining articles onto the first supporting member, and thus all of the target articles that are supported by the second supporting member can be loaded onto the first supporting member. Therefore, it is possible to continuously load target articles onto the first supporting member even when the positions or orientations of target articles that have been loaded onto the first supporting member are different from those indicated by arrangement information, and to smoothly load all of the plurality of target articles onto the first supporting member.

DETAILED DESCRIPTION OF PREFERRED EMBODIMENTS

The following describes embodiments of an article loading facility with reference to the drawings.

Figure 1:
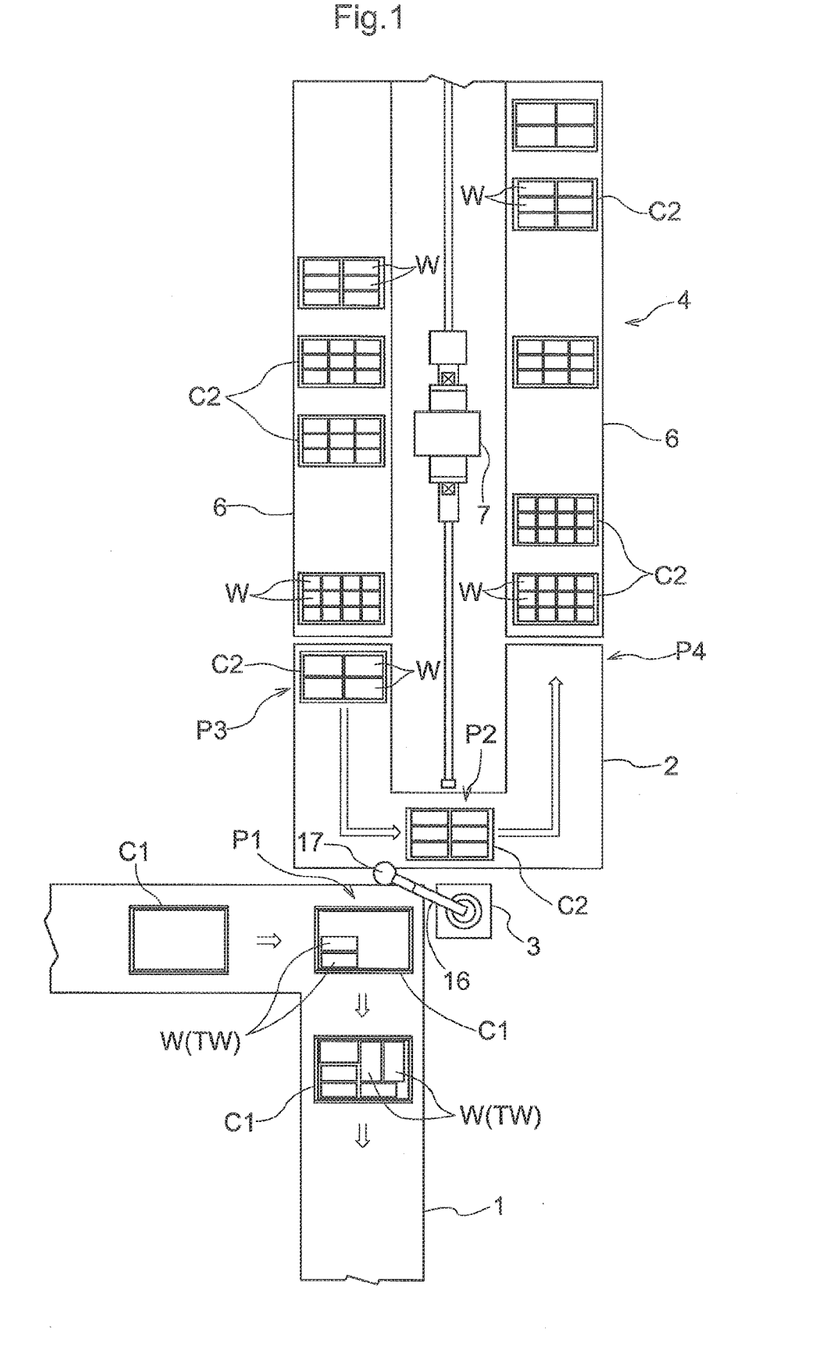
FIG. 1 is a plan view of an article loading facility.

As shown in FIG. 1, the article loading facility includes: a first transport device 1 that transports first containers C1; a second transport device 2 that transports second containers C2; and a transfer device 3 that transfers articles W that are stored in the second containers C2 to the first containers C1, to store the articles W in the first containers C1. The article loading facility also includes an automated warehouse 4 in which the second containers C2 are stored.

Automated Warehouse

As shown in FIG. 1, the automated warehouse 4 includes a storage rack 6 that stores therein the second containers C2, and a stacker crane 7 that transports the second containers C2. The storage rack 6 includes a plurality of storage units that are arranged along the travelling direction of the stacker crane 7 and along the vertical direction. The storage rack 6 is configured to store therein a plurality of second containers C2 such that the plurality of second containers C2 are stored in the storage units.

The automated warehouse 4 transports a second container C2 that is stored in the storage rack 6 to an unloading position P3 using the stacker crane 7, to unload the second container C2 from the automated warehouse 4, and transports a second container C2 at a loading position P4 to the storage rack 6 using the stacker crane 7, to load the second container C2 to the automated warehouse 4.

First Transport Device and Second Transport Device

The first transport device 1 includes a conveyer such as a roller conveyer, and transports the first containers C1 in one direction. A first position P1 is set midway in the transport path of the first transport device 1. The first transport device 1 transports the first containers C1 from a transport source (not shown) to the first position P1, and also transports the first containers C1 from the first position P1 to the transport destination (not shown). No articles W are stored in the first containers C1 that are transported to the first position P1 by the first transport device 1, whereas articles W that have been transported by the transfer device 3 are stored in the first containers C1 that are transported from the first position P1 by the first transport device 1.

The second transport device 2 includes a conveyer such as a roller conveyer, and transports the second containers C2 in one direction. The unloading position P3 is set at the upstream end of the transport path of the second transport device 2, the loading position P4 is set at the downstream end of the transport path of the second transport device 2, and a second position P2 is set midway in the transport path of the second transport device 2. The second transport device 2 transports the second containers C2 from the unloading position P3 to the second position P2, and transports the second containers C2 from the second position P2 to the loading position P4. One or more articles W are stored in the second containers C2 that are transported to the second position P2 by the second transport device 2, and articles W that are stored in one second container C2 are articles W of the same type.

That is, in the article loading facility, a first container C1 that is empty is transported to the first position P1 by the first transport device 1. Also, a second container C2 in which articles W are stored is unloaded from the automated warehouse 4 by the stacker crane 7, and the second container C2 thus unloaded is transported to the second position P2 by the second transport device 2.

The transfer device 3 takes articles W out of a second container C2 that is located at the second position P2, and transfers the articles W thus taken out, from the second container C2 to a first container C1 that is located at the first position P1, so that the articles W are stored in the first container C1. The second container C2, from which all of the articles W that are to be taken out have been taken out, is transported from the second position P2 by the second transport device 2 and is loaded to the automated warehouse 4. The first container C1, in which all of the articles W that are to be stored are stored, is transported from the first position P1 by the first transport device 1. In the following description, an article W that is to be transferred to a first container C1, out of articles W that are stored in a second container C2 that has been transported to the second position P2, is referred to as a target article TW.

Containers

Figure 2:
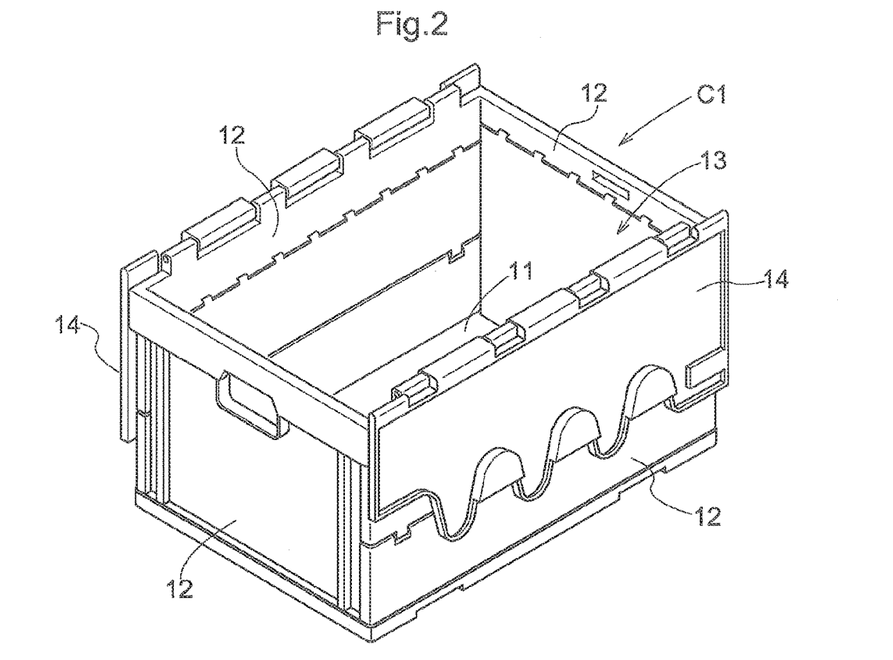
FIG. 2 is a perspective view of a first container.

As shown in FIG. 2, each first container C1 includes a supporting portion 11 that has a rectangular shape and supports articles W from below, and side wall portions 12 that respectively stand upright on four sides that constitute an outer edge of the supporting portion 11. Thus, each first container C1 is formed so as to have a box shape with an open upper face. Each first container C1 also includes a lid member 14 that can be switched to a closed state in which the lid member 14 closes an opening 13 in the upper surface, and an open state in which the lid member 14 opens the opening 13 in the upper surface. Each first container C1 stores therein articles W such that one or more tiers of articles W are stacked in the vertical direction on the supporting portion 11.

As with the first containers C1, each second container C2 includes the supporting portion 11 that has a rectangular shape and supports articles W from below, and the side wall portions 12 that respectively stand upright on four sides that constitute an outer edge of the supporting portion 11. Thus, each second container C2 is formed so as to have a box shape with an open upper face, and stores therein articles W such that the articles W are supported by the supporting member 11 from below.

In the present embodiment, foldable containers made of resin are used as the first containers C1 and the second containers C2. Containers without the lid member 14 may be used as the first containers C1. The capacity of each first container C1 and each second container C2 can be calculated based on the inner dimensions of each container. For example, the capacity of each of the containers with the lid member 14 (the first containers C1) can be calculated by the inside width×the inside length×the height (the length from the upper surface of the supporting portion 11 to the lower surface of the lid member 14 in the closed state), and the capacity of each of the containers without the lid member 14 (the second containers C2) can be calculated by the inside width×the inside length×the height (the length from the upper surface of the supporting portion 11 to the upper ends of the side wall portions 12). In the present embodiment, loading articles W onto the first containers C1 and the second containers C2 is expressed as storing articles W in the first containers C1 and the second containers C2.

A loading area in which articles W are stored is formed in the inner space of each first container C1 and the inner space of each second container C2. Note that first containers C1 with the lid member 14 in the open state correspond to the first supporting member, and the second containers C2 correspond to second supporting members that support target articles TW on a type-by-type basis.

Articles W have a rectangular parallelepiped shape (are formed so as to have a rectangular parallelepiped external shape), and there are various types of articles W. Articles W of the same type have the same length, width, and height. That is, when two articles W are of the same type, these two articles W have the same length, width, and height, whereas when two articles W are of different types, these two articles W may have the same length, width, and height, or be different in one or more or all of length, width, and height.

Articles W of a plurality of types are stored in second containers C2 on a type-by-type basis. That is, one or more articles W of one type are stored in each second container C2. A first container C1 stores therein articles W that have been transferred thereto from one second container C2 or a plurality of second containers C2. Therefore, articles W of one type or articles W of a plurality of types may be stored in a first container C1.

Articles W are stored in the second containers C2 so as to be in an appropriate orientation. More specifically, each article W is stored in the corresponding second container C2 in an orientation (the appropriate orientation) in which support-target surfaces of each article W are parallel with the bottom surface of the container (the upper surface of the supporting portion 11), the support-target surfaces being predetermined two surfaces that are parallel with each other. That is, if an article W in an appropriate orientation is inverted upside down, the article W will still be in an appropriate orientation, and if an article W in an appropriate orientation is rotated about an axis that is orthogonal to the support-target surfaces of the article W, the article W will still be in an appropriate orientation.

The first containers C1 store therein articles W that have been transferred thereto by the transfer device 3, such that the articles W are in an appropriate orientation. The length in the vertical direction of an article W in an appropriate orientation is referred to as "the height", and the length in the lengthwise direction of the article W when viewed in the vertical direction is referred to as "the length", and the length in the lateral direction of the article W when viewed in the vertical direction is referred to as "the width".

Transfer Device

The transfer device 3 includes an arm 16 that has a plurality of joints, and a suction pad 17 that is supported at the leading end of the arm 16. The transfer device 3 is configured to suck and support an article W using the suction pad 17. The transfer device 3 takes articles W out of a second container C2 that is located at the second position P2, and transfers the articles W thus taken out, from the second container C2 to a first container C1 that is located at the first position P1, so that the articles W are stored in the first container C1.

The suction pad 17 is configured to be swingable about an axis that extends along the vertical direction, and swingable about an axis that extends along a horizontal direction, relative to the arm 16. The arm 16 is configured to change the orientation of the suction pad 17 to a first orientation in which the suction pad 17 sucks a surface of a target article TW from above, the surface facing upward, and a second orientation in which the suction pad 17 has swung from the first orientation, about an axis that extends along a horizontal direction, by bending and stretching the arm 16 at the joints thereof, and swinging the suction pad 17 relative to the arm 16.

Note that the transfer device 3 corresponds to the loading operation unit that performs an operation to load a plurality of target articles TW onto one first container C1 (the first supporting member).

The transfer device 3 is configured to perform a transfer operation to transfer an article W from a second container C2 to a first container C1. In this transfer operation, the upper surface of an article W that is stored in a second container C2 in a given orientation is sucked and supported by the suction pad 17, thereafter the article W thus supported is moved to a position that is immediately above the supporting portion 11 of a first container C1 so as to be in the same orientation as the orientation when the article W was sucked, and then the article W is released from the sucked state. As a result of such a transfer operation, an article W that was stored in a second container C2 in an appropriate orientation can be stored in a first container C1 in an appropriate orientation.

Control Device

Figure 3:
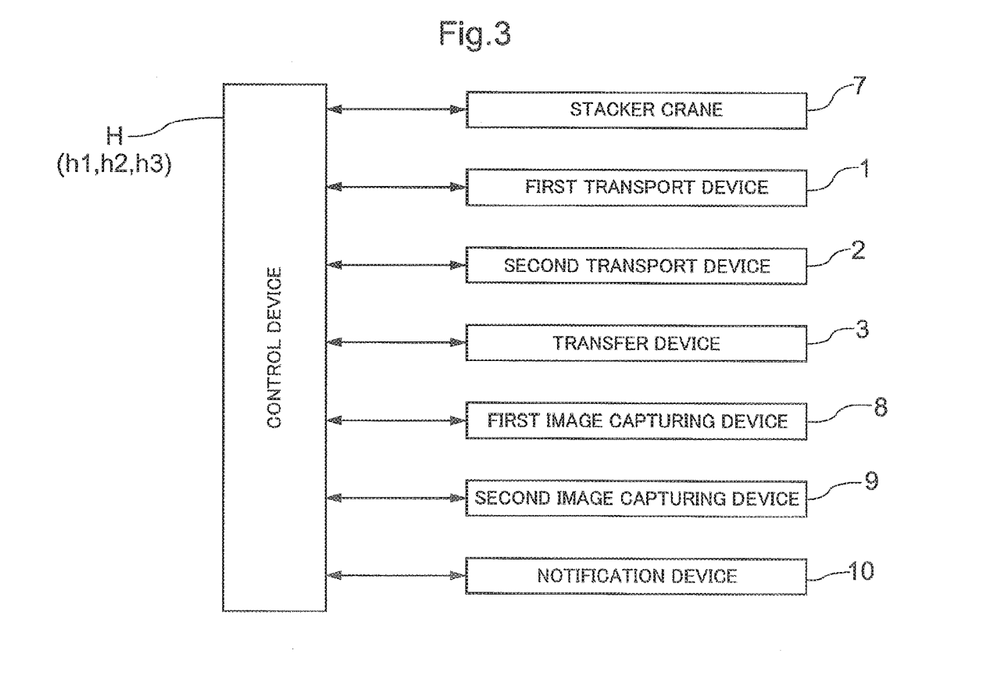
FIG. 3 is a control block diagram.

As shown in FIG. 3, the article loading facility includes a control device H that controls the first transport device 1, the second transport device 2, the transfer device 3, and the stacker crane 7. That is, the control device H has the function of a control unit h1 that controls the transfer device 3. The control device H also has the function of a setting unit h2 that performs an arrangement setting process to set arrangement information for each of one or more target articles TW that are to be stored in a first container C1, the arrangement information indicating the orientation and the position of the corresponding target article TW relative to the first container C1.

Articles W of a plurality of types are respectively assigned product codes that differ according to type. The control device H stores therein sets of a product code and article information in association with each other, the article information indicating the length, width, height, and weight of an article W of the type indicated by the corresponding product code. The control device H also stores therein storage position information of a second container C2 that is stored in the automated warehouse 4, and the product codes of the articles W that are stored in the second container C2, in association with each other.

Order information is transmitted to the control device H from a plurality of shipping destinations. The order information includes code information that indicates product codes that are respectively set for the types of articles W, and number information that indicates, for each of the product codes indicated by the code information, the number of articles W of the type that corresponds to the product code. The pieces of order information are each assigned an order number according to the order in which the pieces of information have been transmitted from shipping destinations.

Image capture information obtained by a first image capturing device 8 and image capture information obtained by a second image capturing device 9 are transmitted to the control device H. The first image capturing device 8 is installed so as to be able to capture an image of a first container C1 that is located at the first position P1, and an article W that is stored in the first container C1. The second image capturing device 9 is installed so as to be able to capture an image of a second container C2 that is located at the second position P2, and an article W that is stored in the second container C2.

The control device H is configured to determine the orientation and the position of an article W that is stored in a first container C1 that is located at the first position P1, based on the image capture information obtained by the first image capturing device 8, to determine whether the article W is in an appropriate state, in which the article W is stored in the first container C1 according to the arrangement indicated by the arrangement information, or in a different state, in which the article W is not stored in the first container C1 according to the arrangement indicated by the arrangement information.

That is, the control device H has the function of a determination unit h3 that determines whether or not the article W that is supported by the first container C1 is in a different state, in which the article W is not loaded according to the arrangement, based on the image capture information obtained by the first image capturing device 8. Note that the first image capturing device 8 corresponds to the detection unit that detects the orientation and the position of a target article TW that is supported by the first container C1 (the first supporting member) relative to the first container C1.

The control device H is configured to determine the orientation and the position of an article W that is stored in a second container C2 that is located at the second position P2, based on the image capture information obtained by the second image capturing device 9, to determine whether the article W stored in the second container C2 is an article W that is in an appropriate orientation, or an article W that is in an inappropriate orientation that is different from the appropriate orientation.

The control device H is configured to determine whether an article W that is stored in a second container C2 is in a supportable orientation, in which a first support-target surface of the article W in the second container C2 can be sucked and supported by the suction pad 17 from above, or an unsupportable orientation, in which the first support-target surface of the article W in the second container C2 cannot be sucked or supported by the suction pad 17 from above, based on the image capture information obtained by the second image capturing device 9. Note that the control device H determines that the orientation of an article W is a supportable orientation if the inclination of the first support-target surface relative to the supporting portion 11 of the second container C2 is smaller than a preset angle (45° in the present embodiment), and that the orientation of the article W is an unsupportable orientation if the inclination of the first support-target surface relative to the supporting portion 11 of the second container C2 is larger than or equal to the preset angle.

Figure 4:
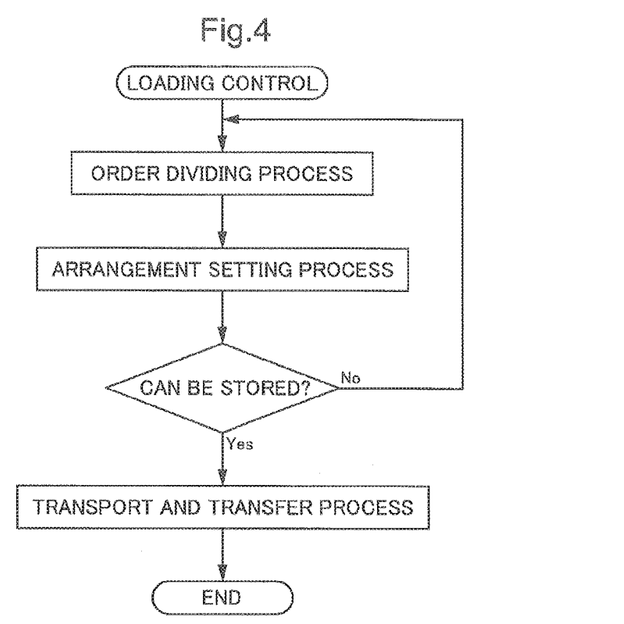
FIG. 4 is a flowchart for loading control.
Figure 5:
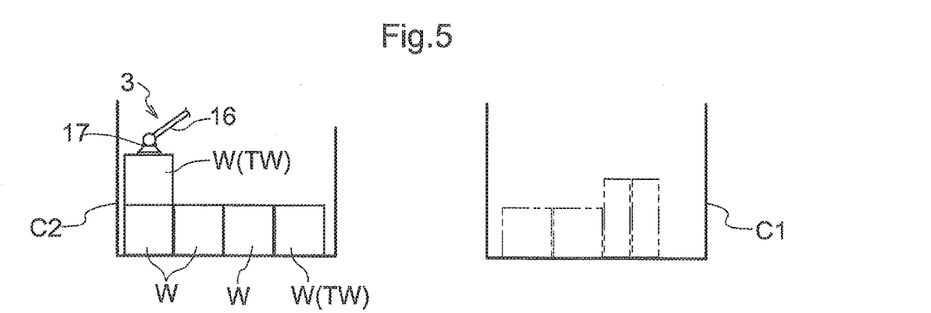
FIG. 5 illustrates operations for a first loading control.
Figure 6:
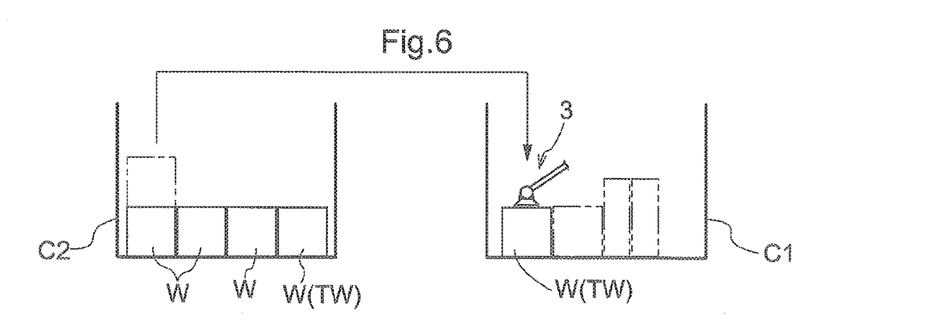
FIG. 6 illustrates operations for the first loading control.
Figure 7:
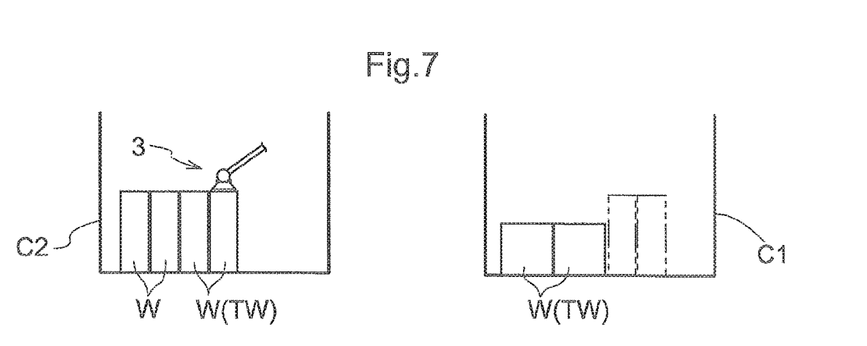
FIG. 7 illustrates operations for the first loading control.
Figure 8:
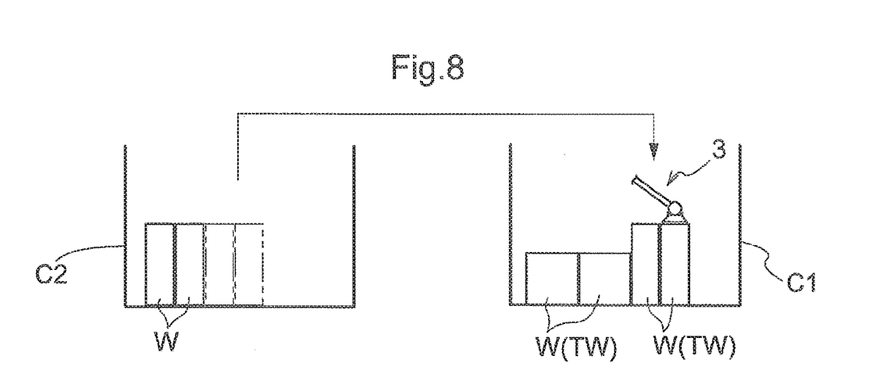
FIG. 8 illustrates operations for the first loading control.

As shown in FIG. 4, the control device H performs an order dividing process, an arrangement setting process, and a transport and transfer process (the loading process) in this order. The order dividing process is a process for setting the number of first containers C1 onto which load-target articles W indicated by the arrangement order information are to be loaded. The arrangement setting process is a process for setting, for each of one or more target articles TW that are to be stored in one first container C1, the arrangement information that indicates the orientation and the position of the corresponding target article TW relative to the first container C1. The transport and transfer process (the loading process) is a process for controlling the first transport device 1, the second transport device 2, and the transfer device 3 based on the arrangement information so that one or more target articles TW is stored in a first container C1 according to the orientations and the positions indicated by the arrangement information. Note that an article W that is indicated by the arrangement order information is referred to as a load-target article W, and an article W that is to be stored in one first container C1 is referred to as a target article TW. In the case where all of the articles W indicated by the arrangement order information are to be stored in one first container C1, the load-target articles W are the same as the target articles TW.

The following are additional descriptions of the order dividing process, the arrangement setting process, and the transport and transfer process (the loading process).

Order Dividing Process

The order dividing process is a process for setting the number of first containers C1 in which load-target articles W indicated by the arrangement order information are to be stored.

Specifically, the load-target articles W are stored such that the total volume of the articles W that are to be stored in one first container C1 will be smaller than or equal to a preset volume of the first container C1 in which articles W are to be stored, based on the volume of each load-target article W and the number of load-target articles W indicated by the arrangement order information. In the present embodiment, the preset volume is 60% of the capacity of each first container C1. If the total volume of the load-target articles W indicated by the arrangement order information is smaller than or equal to 60% of the capacity of each first container C1, it is determined that the load-target articles W can be stored in one first container C1, and one is set as the number of first containers C1. If the total volume of the load-target articles W indicated by the arrangement order information is greater than 60% of the capacity of each first container C1, two or more is set as the number of first containers C1 so that the total volume of articles W that are to be stored in one first container C1 will be smaller than or equal to 60% of the capacity.

Arrangement Setting Process

In the arrangement setting process, the arrangement information is set in advance to indicate an arrangement that, after all target articles TW of a first type are stored in first containers C1, allows all target articles TW of a second type, which is different from the first type, to be stored in first containers C1, and an arrangement order setting process is performed to set a type arrangement order that indicates, when target articles TW of a plurality of types are to be stored in first containers C1 according to the arrangement information, the order in which the plurality of types are to be arranged. Note that setting the arrangement information in advance means setting the arrangement information before performing an operation to store target articles TW in first containers C1, i.e. setting the arrangement information before performing the transport and transfer process (the loading process).

In the arrangement setting process, the control device H also sets an arrangement in which target articles TW are stacked in one or more tiers in the vertical direction, and sets an arrangement in which target articles TW of the same type are preferentially arranged in the same tier if an arrangement in which target articles TW are stacked in a plurality of tiers has been set.

Specifically, in the arrangement setting process, an arrangement is set to load articles W (target articles TW), which are to be stored in one first container C1, to one or more tiers in the first container C1. That is, for example, if there are articles W with a product code A and articles W with a product code B as target articles TW, the order of A and B is set as the type arrangement order, for example. Then, an arrangement is set so as to allow all of the articles W with the product code B to be stored in the first container C1 after all of the articles W with the product code A, which comes first, have been stored in the first container C1.

In the arrangement setting process, a plurality of arrangement patterns are created by changing the type arrangement order and the positions and orientations of articles W until a preset time has elapsed after the order dividing process has been completed. The arrangement patterns are created in this arrangement setting process by determining an arrangement from the lowest tier, and determining arrangements for all of the target articles TW.

In the arrangement setting process, an arrangement pattern in which the area of a portion that supports target articles TW, out of a supporting surface (a surface for supporting target articles TW, of the first container C1 (a surface that faces upward, of the supporting portion 11)), is the largest is preferentially selected from among the plurality of arrangement patterns that have been created as described above. If the area of the portion that supports target articles TW is the same in several arrangement patterns, an arrangement pattern that leads to the smallest height of target articles TW when target articles TW are stacked according to the arrangement pattern is preferentially selected, for example. Thus, one arrangement pattern is selected. In this way, in the arrangement setting process, an arrangement (an arrangement pattern) is set to load articles W (target articles TW), which are to be stored in one first container C1, to one or more tiers in the first container C1.

In the arrangement setting process, depending on the combination of the types and number of articles W, there are cases where the height of target articles TW is larger than the height of each first container C1 in all of the plurality of arrangement patterns that have been created as described above when the target articles TW are stacked according to the corresponding arrangement pattern. In such cases, the control device H determines that it is impossible to store articles W, and performs the order dividing process again. If the order dividing process is performed again, it is conceivable that the preset volume in the previous order dividing process (60%, for example) will be lowered (to 50%, for example).

Transport and Transfer Process

In the transport and transfer process, the first transport control, the second transport control, and the transfer control are performed, and as a result, all of the target articles TW are transferred from one or more second containers C2 to one first container C1, and the target articles TW are stored in the first container C1 according to an arrangement indicated by the arrangement information.

The second transport control is control that is performed to control the second transport device 2 and the stacker crane 7 to transport a second container C2 from the storage rack 6 to the second position P2, and, after all of the target articles TW stored in the second container C2 have been taken out by the transfer device 3 at the second position P2, transport the second container C2 from the second position P2 to the storage rack 6. Also, in the second transport control, second containers C2 are transported to the second position P2 such that the articles W of a plurality of types stored in the second containers C2 that are to be transported to the second position P2 will be arranged in the order indicated by the type arrangement order.

The first transport control is control that is performed in parallel with the second transport control, to control the first transport device 1 to transport an empty first container C1 from the outside to the first position P1, and, after all of the target articles TW have been transferred to the first container C1 at the first position P1 by the transfer device 3, transport the first container C1 from the first position P1 to the outside.

The transfer control is control that is performed to control the transfer device 3 to take out target articles TW that are stored in a second container C2 at the second position P2, and store the articles TW in a first container C1 at the first position P1 according to an arrangement indicated by the arrangement information.

In this way, it is possible to transport a plurality of articles W all at once to the second position P2 by transporting a second container C2 in which the articles W are stored to the second position P2, and it is unnecessary to transport a second container C2 in which target articles TW of the same type are stored to the second position P2 a plurality of times. Therefore, it is possible to reduce the time required to load a plurality of target articles TW into a first container C1.

Transfer Control

Transfer control will be described next.

In the description of transfer control, a flat face that faces downward of a target article TW that is in an orientation indicated by the arrangement information is defined as a support-target surface, and a surface that faces upward of a target article TW that is in an orientation indicated by the arrangement information is defined as a first sucking-target surface. In other words, a surface that faces downward of a target article TW that is in the appropriate orientation is the support-target surface, and a surface that faces upward of a target article TW that is in the appropriate orientation is the first sucking-target surface. Incidentally, if a target article TW has a box shape, for example, there are cases where the target article TW bulges due to changes in the temperature or the atmospheric pressure, or due to the target article TW being overstuffed, for example. Such the surface of a bulging target article TW that faces downward when the target article TW is in the orientation indicated by the arrangement information is bulging compared to a flat surface. However, even if the target article TW is bulging and the surface of the bulging target article TW that faces downward when the target article TW is in the orientation indicated by the arrangement information is not flat when the target article TW is transferred, the surface of the target article TW that faces downward when the target article TW is in the orientation indicated by the arrangement information is assumed as being "a flat surface" if the surface of the target article TW that faces downward when the target article TW is in the orientation indicated by the arrangement information is flat under predetermined conditions (predetermined conditions regarding the temperature and the atmospheric pressure, conditions under which the target article TW is staffed with a predetermined amount of goods).

The surface of the article W that faces upward when the article W is not in the appropriate orientation is defined as a second sucking-target surface. That is, if the orientation of the article W that is not in the appropriate orientation is an unsupportable orientation (the inclination of the first sucking-target surface is larger than or equal to the preset angle (45° in the present embodiment)), one surface out of four surfaces other than two surfaces that are the support-target surface and the first sucking-target surface is the second sucking-target surface out of the six surfaces of the article W. Specifically, if an article W is rotated from the appropriate orientation by 90°, one surface out of four surfaces other than two surfaces that are the support-target surface and the first sucking-target surface is the second sucking-target surface out of the six surfaces of the article W. If the orientation of an article W that is not in the appropriate orientation is a supportable orientation (the inclination of the first sucking-target surface is smaller than the preset angle), the surface that is the first sucking-target surface when it is assumed that the article W is in the appropriate orientation is the second sucking-target surface out of the six surfaces of the article W. Specifically, if an article W is rotated from the appropriate orientation by 30°, for example, the surface that is the first sucking-target surface when it is assumed that the article W is in the appropriate orientation is the second sucking-target surface out of the six surfaces of the article W.

After the first loading control has been completed, if it is determined in the first determination process that the state is an appropriate state, the control device H repeats the first loading control. After the first loading control has been completed, if it is determined in the first determination process that the state is a different state, the control device H performs the second loading control instead of the first loading control.

The first loading control is control that is performed to control the transfer device 3 to load a plurality of target articles TW onto the first container C1 according to the arrangement information that indicates the orientation and the position of each target article TW on the first container C1.

The second loading control is control that is performed to execute a second determination process based on the arrangement information and the volume of the loading area (the storage capacity volume), to determine that the remaining articles W can be loaded onto a first container C1 if the proportion of the total volume of the target articles TW to the volume of the loading area is no greater than a preset proportion (30% in the present embodiment), and to control the transfer device 3 to store the remaining articles W in the first container C1 even if the arrangement of the target articles TW that have been stored in the first container C1 is different from the arrangement indicated by the arrangement information if it is determined in the second determination process that the remaining articles W are loadable. As a result, the remaining articles W are stored in the first container C1, with the arrangement of the target articles TW in the first container C1 remaining different from the arrangement indicated by the arrangement information.

Note that the remaining articles W are articles W that are not stored in the first container C1 out of the target articles TW when it is determined in the first determination process that the state is a different state. That is, the remaining articles W include articles W that are stored in the second container C2 out of the target articles TW, and if there are target articles TW that are being transferred by the transfer device 3, such target articles TW are also included in the remaining articles W.

In the first loading control, the sucking-target surface (the first sucking-target surface) of a target article TW that is supported by a second container C2 is supported from above, then the suction pad 17 is moved to move the target article TW to a position that is immediately above the supporting portion 11 of the first container C1 so that the target article TW is moved to a position indicated by the arrangement information, and thereafter the target article TW is released from the state of being sucked by the suction pad 17 when the first sucking-target surface faces upward. As described above, through the first loading control, the target articles TW that are stored in a second container C2 in the appropriate orientation can be stored in the first container C1 in the appropriate orientation according to the arrangement information.

The control device H performs the second determination process to obtain the proportion of the total volume of the target articles TW relative to the storage capacity volume of the first container C1. If the proportion of the total volume of the target articles TW relative to the storage capacity volume of the first container C1 is no greater than 30%, it is determined that the target articles TW are loadable, and if the proportion of the total volume of the target articles TW relative to the storage capacity volume of the first container C1 is greater than 30%, it is determined that the target articles TW are not loadable.

If the control device H performs the second determination process and determines that the target articles TW are loadable, first, a transfer position to which a target article TW is transferred is set based on the image capture information obtained by the first image capturing device 8, and the sucking-target surface (the first sucking-target surface) of the target article TW that is supported by a second container C2 is supported from above, and then the suction pad 17 is moved such that the target article TW is located at a position that is immediately above the transfer position and that is above the uppermost height in the loading area (the height represented as a one-dot chain line in FIG. 9) so that the target article TW is located immediately above the supporting portion 11 of the first container C1. Thereafter, the target article TW is released from the state of being sucked by the suction pad 17, and thus the target article TW is stored in the first container C1.

Figure 9:
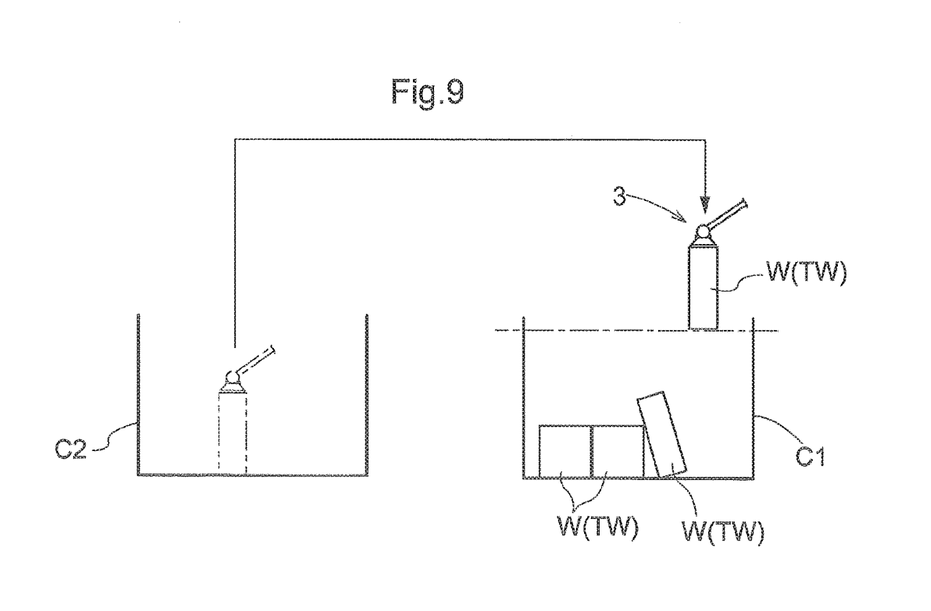
FIG. 9 illustrates operations for a second loading control.

The transfer position is set to, for example, a position where a surface that is larger than the lower surface of the target article TW, out of the upper surface of the first container C1 and the upper surfaces of the target articles TW stored in the first container C1, is present when viewed in the vertical direction, based on the image capture information obtained by the first image capturing device 8, for example. As described above, by performing the second loading control, the target articles TW that are stored in a second container C2 in the appropriate orientation can be stored in the first container C1. Regarding the height at which the target article TW is released from the state of being sucked by the suction pad 17, if there is no risk of the target article TW that is sucked and supported by the suction pad 17 interfering with the target articles TW stored in the first container C1, the lower end of the target article TW that is sucked and supported may be located lower than the uppermost height in the loading area.

Figure 10:
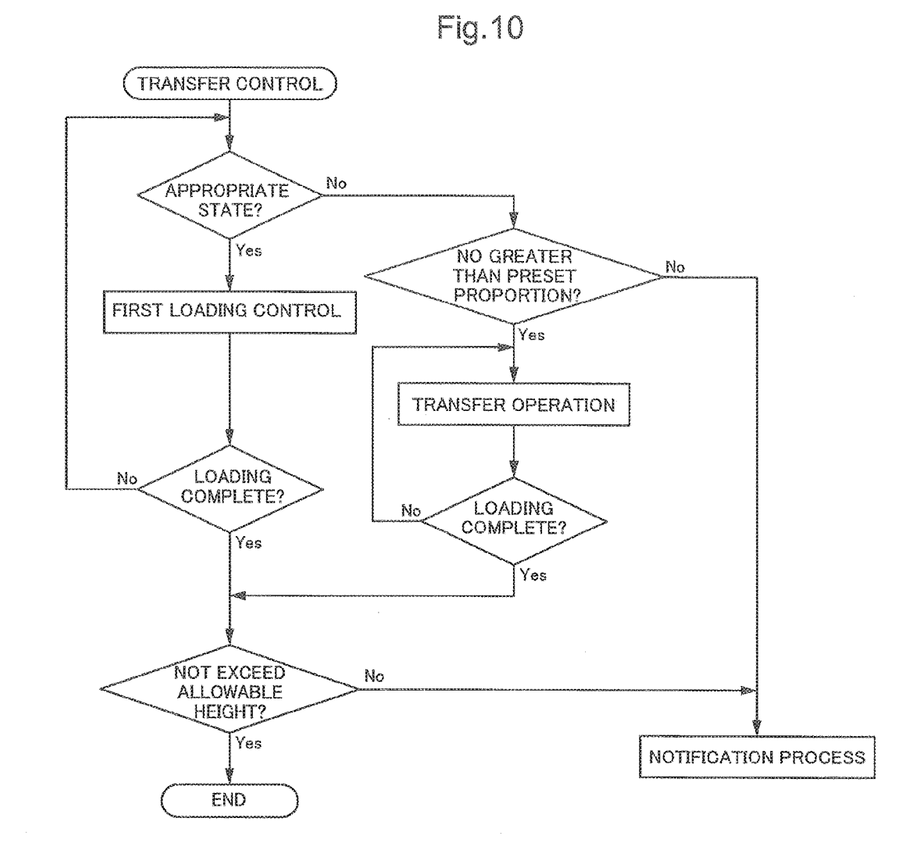
FIG. 10 is a flowchart for transfer control.

The following describes transfer control based on the flowchart shown in FIG. 10.

The control device H first determines the position and the orientation of each of one or more articles W that are stored in a second container C2, based on the image capture information obtained by the second image capturing device 9, and if it is determined based on the image capture information obtained by the first image capturing device 8 that there is a target article TW that is stored in the first container C1, the control device H determines the position and the orientation of the target article TW. Then, by performing the first determination process, the control device H determines whether the target article TW stored in the first container C1 is in the appropriate state or the different state, based on the image capture information obtained by the first image capturing device 8.

If it is determined in the first determination process that the state is the appropriate state, the control device H repeats the first loading control until all of the target articles TW are stored in the first container C1. The control device H repeats the first loading control, and if all of the target articles TW have been stored in the first container C1, and upon completion of the loading of the target articles TW onto the first container C1, the control device H determines whether or not the target articles TW are stored in the first container C1 without exceeding an allowable height (a height that is lower than the lower surface of the lid member 14 in a closed state by a preset amount (e.g. several millimeters or several centimeters)). If the target articles TW are stored without exceeding the allowable height, the control device H completes the transfer control, and if the stored target articles TW exceed the allowable height, the control device H performs a notification process to activate a notification device 10 (corresponding to the notification unit) to notify the operator of an abnormality, indicating that not all of the target articles TW are appropriately stored in the loading area of the first container C1. Note that one or more buzzers that generate sound, one or more revolving lights that emit light, one or more monitors that display information that indicates the occurrence of an abnormality, and so on may be used as the notification device 10.

As described above, after the first loading control has been completed, if it is determined in the first determination process that the positions and the orientations of the target articles TW stored in the first container C1, including the target articles TW stored in the first container C1 by the first loading control, are not in the appropriate state, the second loading control is performed instead of the first loading control. In the second loading control, if the proportion is no greater than the preset proportion, the transfer device 3 is controlled so as to perform transfer operations to transfer the target articles TW from the second container C2 to the first container C1, and if the proportion is greater than the preset proportion, the notification process is executed to activate the notification device 10.

In this way, the control device H performs the first loading control to store the target articles TW in the first container C1 according to the arrangement information. While performing the first loading control, if the determination unit h3 determines in the first determination process that the state is the appropriate state, the control device H performs the second loading control instead of the first loading control, and even if the arrangement of the remaining articles W is different from the arrangement indicated by the arrangement information, the remaining articles W are stored in the first container C1, and thus all of the target articles TW can be stored in the first container C1.

Other Embodiments (1) In the above-described embodiment, whether or not the remaining articles can be loaded onto the first container is determined in the second determination process based on the arrangement information and the volume of the loading area. However, in the second determination process, whether or not the remaining articles can be loaded onto the first container C1 may be determined based on at least one of: the arrangement information; detection information obtained by the detection unit; and information regarding the loading area of the first container on which articles can be loaded.

That is, for example, the second determination process may be modified so as to detect a loadable surface onto which the remaining articles are loadable, from among the upper surface of the first container and the upper surfaces of the target articles that are stored in the first container, based on detection information obtained by the first image capturing device, and to determine that the remaining articles are loadable onto the first container if the remaining articles do not exceed the uppermost height in the first container when it is assumed that the remaining articles are loaded onto the loadable surface.

Figure 12:
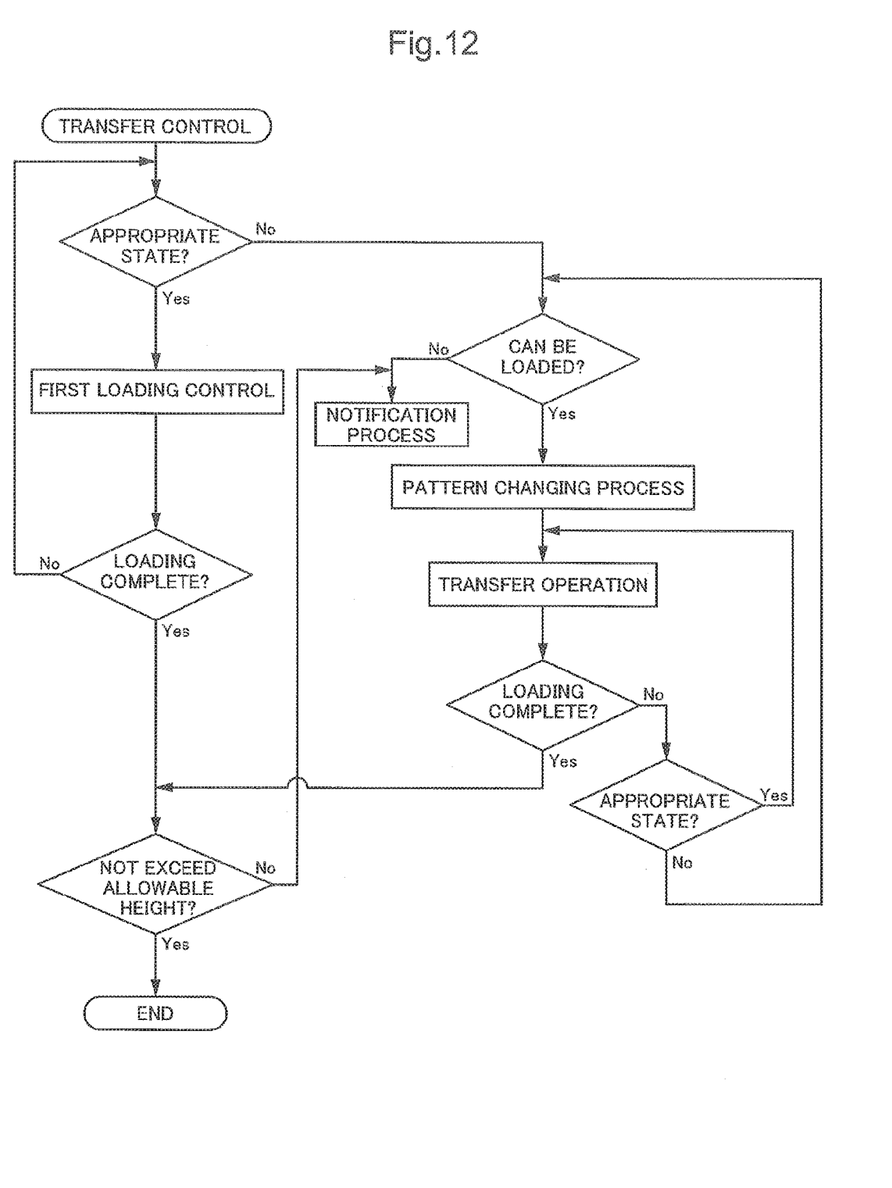
FIG. 12 is a flowchart for transfer control according to the other embodiment (1).

Specifically, as shown in the flowchart in FIG. 12, while the first loading control is repeatedly performed, if it is determined in the first determination process that the state is not the appropriate state, the second loading control is performed instead of the first loading control.

Figure 11:
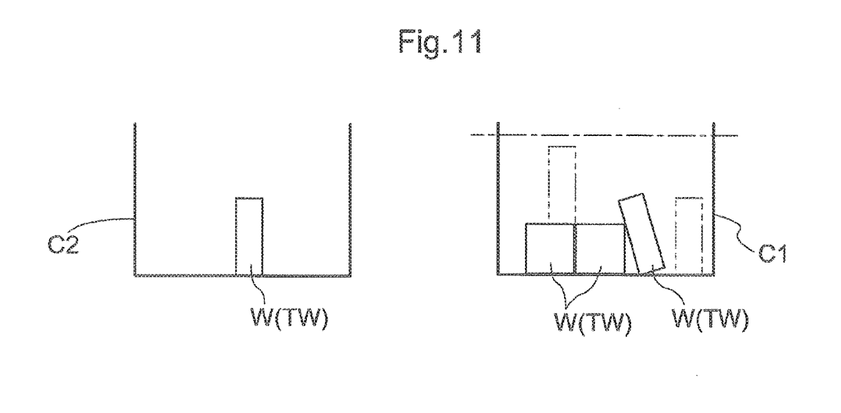
FIG. 11 illustrates operations for a second loading control according to another embodiment (1).

In the second determination process in the second loading control, the upper surface of the supporting portion 11 of the first container C1 and the upper surfaces of the target articles TW on the first container C1 that are parallel with the upper surface of the supporting portion 11 are detected based on the image capture information obtained by the first image capturing device 8, and if the target articles TW do not exceed the uppermost height in the first container C1 when it is assumed that the remaining articles W are loaded onto the loadable surface as shown in FIG. 11, it is determined that the remaining articles W are loadable. More specifically, a loading pattern for loading the remaining articles W onto the upper surface of the supporting portion 11 of the first container C1 and the upper surfaces of the target articles TW loaded onto the first container C1 is created. If the target articles TW that are to be loaded according to the loading pattern thus created do not exceed the uppermost height, it is determined that the remaining articles W are loadable. If the target articles TW that are to be loaded according to the loading pattern thus created exceed the uppermost height, it is determined that the remaining articles W are unloadable.

Then, in the second loading control, if it has been determined in the second determination process by the determination unit h3 that the remaining articles W are loadable, the loading pattern is changed to the new loading pattern that has been set by the second loading control, and the transfer device 3 is controlled to perform the transfer operation to transfer the target articles TW from the second container C2 to the first container C1 so that the target articles TW are stored in the first container C1 according to the new loading pattern. In the second loading control, if it has been determined in the second determination process by the determination unit h3 that the remaining articles W are unloadable, the notification process is executed.

(2) Alternatively, for example, the second determination process may be modified so as to determine whether or not the remaining articles W can be loaded onto the first container C1 by determining whether or not the number of remaining articles W is no greater than a preset number, based on the arrangement information and detection information obtained by the image capturing devices (both or either one of the first image capturing device 8 and the second image capturing device 9).

Figure 13:
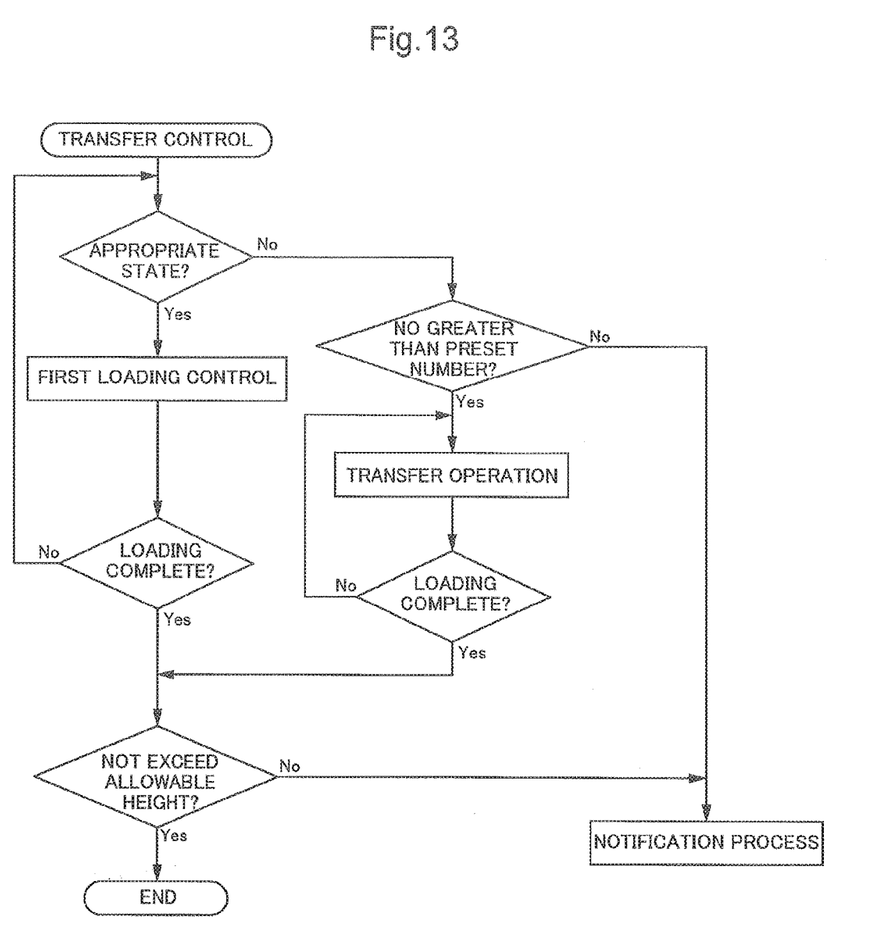
FIG. 13 is a flowchart for transfer control according to another embodiment (2).

Specifically, as shown in the flowchart in FIG. 13, while the first loading control is repeatedly performed, if it is determined in the first determination process that the state is not the appropriate state, the second loading control is performed instead of the first loading control.

Then, in the second determination process in the second loading control, the number of remaining articles W is obtained based on the total number of target articles TW, which is based on the arrangement information, and the number of target articles TW that are stored in the first container C1, which is based on the first image capture information. If the number of remaining articles W is no greater than the preset number (e.g. 1 or 2), it is determined that the remaining articles W are loadable, and if the number of remaining articles W is greater than the preset number, it is determined that the remaining articles W are unloadable.

Then, in the second loading control, if it is determined in the second determination process that the remaining articles W are loadable, the transfer device 3 is controlled to perform the operation to transfer the target articles TW from the second container C2 to the first container C1, and if it is determined in the second determination process that the remaining articles W are unloadable, the notification process is performed to activate the notification device 10.

Note that after the transfer device 3 has been controlled to perform the operation to transfer the target articles TW from the second container C2 to the first container C1, if the positions and the orientations of the target articles TW stored in the first container C1 has been determined in the second determination process as not being in the appropriate state, and if the number of remaining articles W is no greater than the preset number, the remaining articles may be stored in the first container C1 using the second loading control according to the other embodiment (1).

(3) In the above-described embodiment, the arrangement information indicates an arrangement in which articles are stacked in one or more tiers. However, the arrangement information may indicate an arrangement in which articles are stacked in only one tier.

(4) In the above-described embodiment, the external shape of each article is a rectangular parallelepiped shape. However, the external shape may be a shape other than a rectangular parallelepiped shape, such as a hemisphere shape or a triangular pyramid shape, and it is only necessary that each article has a flat surface that faces downward when the article is in the appropriate orientation.

(5) In the above-described embodiment, containers that have a box shape with an open upper face are used as the first supporting member and the second supporting member. However, a member that has a plate-like shape such as a palette-like shape, or a transport conveyor or the like that has a transport function may be used as one or both of the first supporting member and the second supporting member, and the first supporting member and the second supporting member need only have a supporting surface onto which articles can be loaded.

(6) In the above-described embodiment, if it is determined in the second determination process that the remaining articles are loadable, the remaining articles are loaded onto the first container (the first supporting member), with the arrangement of the target articles on the first container (the first supporting member) remaining different from the arrangement indicated by the arrangement information. However, the following configuration may be employed. That is, in the second determination process, the control unit determines that the remaining articles can be loaded onto the first container (the first supporting member) if the orientations of the target articles that are not loaded in the orientations indicated by the arrangement information can be corrected by the transfer device (the loading operation unit) to the orientations indicated by the arrangement information based on detection information obtained by the first image capturing device (the detection unit). Then, if it is determined in the second determination process that the remaining articles are loadable, the control unit controls the transfer device (the loading operation unit) in the second loading control to correct the orientations of the target articles that are not loaded in the orientations indicated by the arrangement information, and thereafter load the remaining articles onto the first container (the first supporting member) according to the arrangement information.

Summary of Above-Described Embodiments

The following is a summary of the above-described article loading facility.

An article loading facility includes: a loading operation unit that loads a plurality of target articles onto one first supporting member; and a control unit that controls the loading operation unit, wherein the control unit performs a first loading control to control the loading operation unit so that the plurality of target articles are loaded onto the first supporting member according to arrangement information that indicates the orientation and the position of each of the plurality of target articles on the first supporting member, the loading operation unit takes out a target article that is supported by the second supporting member, and loads the target article onto the first supporting member, the article loading facility further includes: a detection unit that detects the positions and the orientations of the target articles that are supported by the first supporting member, relative to the first supporting member; and a determination unit that performs a first determination process while the first loading control is performed, to determine whether or not the target articles are in a different state in which the articles are not loaded onto the first supporting member according to the arrangement indicated by the arrangement information, based on detection information obtained by the detection unit, the determination unit executes the first determination process each time a target article is loaded onto the first supporting member, when the target articles are determined as being in the different state in the first determination process, articles that are not loaded on the first supporting member, out of the target articles, are determined as remaining articles, after the first loading control has been completed, the control unit repeatedly performs the first loading control if the determination unit has not determined in the first determination process that the target articles are in the different state, while performing the first loading control, if the determination unit determines in the first determination process that the target articles are in the different state, the control unit performs a second loading control instead of the first loading control, and the second loading control is control that is performed to execute a second determination process based on at least one of: the arrangement information; detection information obtained by the detection unit; and information regarding a loading area of the first supporting member in which articles are loadable, to determine whether or not the remaining articles are loadable onto the first supporting member, and to control the loading operation unit to load the remaining articles onto the first supporting member if the remaining articles are determined as being loadable in the second determination process.

With this configuration, the control unit continuously performs the first loading control and hence a plurality of target articles can be loaded onto the first supporting member according to the arrangement information. However, there are cases where the target articles are not loaded onto the first supporting member according to the arrangement information due to, for example, a target article that has been loaded onto the first supporting member falling down when some of the plurality of target articles that are to be loaded onto the first supporting member have been loaded onto the first supporting member. In such cases, the second loading control is performed instead of the first loading control.

In the second loading control, whether or not the remaining articles are loadable onto the first supporting member is determined based on at least one of: the arrangement information, detection information obtained by the detection unit; and information regarding a loading area of the first supporting member in which articles are loadable, and the loading operation unit is controlled to load the remaining articles onto the first supporting member if the remaining articles are determined as being loadable. That is, even in a case where the target articles are not loaded onto the first supporting member according to the arrangement indicated by the arrangement information, if it is determined that articles can be loaded onto the first supporting member, for example, if there is a sufficient space on the first supporting member so that the remaining articles can be loaded thereon, the loading operation unit loads the remaining articles onto the first supporting member, and thus all of the target articles that are supported by the second supporting member can be loaded onto the first supporting member. Therefore, it is possible to continuously load target articles onto the first supporting member even when the positions or orientations of target articles that have been loaded onto the first supporting member are different from those indicated by arrangement information, and to smoothly load all of the plurality of target articles onto the first supporting member.

Here, it is preferable that, in the second loading control, if the remaining articles have been determined as being loadable in the second determination process, the loading operation unit is controlled so that the remaining articles are loaded onto the first supporting member, with the arrangement of the target articles on the first supporting member remaining different from the arrangement indicated by the arrangement information.

With this configuration, in a case where the target articles are not loaded onto the first supporting member according to the arrangement indicated by the arrangement information, if the determination unit determines that the target articles are in a different state based on the detection information obtained by the detection unit, the second loading control is performed and the remaining articles are loaded onto the first supporting member despite the arrangement of the target articles being different from the arrangement indicated by the arrangement information. Therefore, it is possible to load the remaining articles onto the first supporting member without correcting the arrangement of the target articles that have been loaded onto the first supporting member to the arrangement indicated by the arrangement information.

It is also preferable that an external shape of each article is a rectangular parallelepiped shape, the arrangement information indicates an arrangement in which articles are stacked in one or more tiers in a vertical direction, and in the second determination process, the control unit determines that the remaining articles are loadable onto the first supporting member if all of the remaining articles are loadable onto the first supporting member without exceeding an uppermost height in the loading area.

With this configuration, in a case where the target articles are not loaded onto the first supporting member according to the arrangement indicated by the arrangement information, if the remaining articles are loaded onto the first supporting member in an arrangement that is different from the arrangement indicated by the arrangement information, all of the target articles can be loaded without exceeding the uppermost height of the first supporting member.

It is also preferable that, in the second determination process, the control unit determines that all of the remaining articles are loadable without exceeding the uppermost height in the loading area and the remaining articles are loadable onto the first supporting member if the proportion of a total volume of the target articles to a volume of the loading area is no greater than a preset proportion, based on the arrangement information and the volume of the loading area.

With this configuration, for example, in a case where the preset proportion is 30%, if the proportion of the total volume of the target articles to the volume of the loading area is no greater than 30%, it is determined that the remaining articles are loadable onto the first supporting member despite the arrangement of some of the target articles being different from the arrangement indicated by the arrangement information, and it is determined in the second determination process the remaining articles are loadable.

Even if the target articles are not loaded onto the first supporting member according to the arrangement indicated by the arrangement information due to, for example, a target article on the first supporting member falling down midway through the loading of the target articles onto the first supporting member according to the arrangement information, some or all of the remaining articles are loaded onto the first supporting member in an arrangement that is different from the arrangement indicated by the arrangement information, and thus all of the plurality of target articles can be loaded onto the first supporting member.

It is also preferable that, in the second determination process, the control unit detects a loadable surface onto which the remaining articles are loadable, from among an upper surface of the first supporting member and upper surfaces of the target articles that are loaded onto the first supporting member, based on detection information obtained by the detection unit, and if the remaining articles do not exceed the uppermost height of the first supporting member when it is assumed that the remaining articles are loaded onto the loadable surface, the control unit determines that all of the remaining articles are loadable without exceeding the uppermost height in the loading area and the remaining articles are loadable onto the first supporting member.

With this configuration, if the remaining articles do not exceed the uppermost height in the first supporting member when it is assumed that the remaining articles are loaded onto the upper surface of the first supporting member or the upper surfaces of the target articles loaded onto the first supporting member, it is determined in the second determination process that the remaining articles are loadable.

Even if the target articles are not loaded onto the first supporting member according to the arrangement indicated by the arrangement information due to, for example, a target article on the first supporting member falling down midway through the loading of the target articles onto the first supporting member according to the arrangement information, some or all of the remaining articles are loaded onto the first supporting member in an arrangement that is different from the arrangement indicated by the arrangement information, and thus all of the plurality of target articles can be loaded onto the first supporting member.

It is also preferable that, in the second determination process, the control unit determines whether or not the remaining articles are loadable onto the first supporting member by determining whether or not the number of remaining articles is no greater than a preset number, based on the arrangement information and detection information obtained by the detection unit.

With this configuration, for example, if the preset number is 2, and the number of remaining articles is two or less, it is determined that the remaining articles are loadable onto the first supporting member despite the arrangement of the target articles being different from the arrangement indicated by the arrangement information, and it is determined in the second determination process that the remaining articles are loadable.

Even if the target articles are not loaded onto the first supporting member according to the arrangement indicated by the arrangement information due to, for example, a target article on the first supporting member falling down midway through the loading of the target articles onto the first supporting member according to the arrangement information, some or all of the remaining articles are loaded onto the first supporting member in an arrangement that is different from the arrangement indicated by the arrangement information, and thus all of the plurality of target articles can be loaded onto the first supporting member.

It is also preferable that, in the second determination process, the control unit determines that the remaining articles are loadable onto the first supporting member if the orientations of the target articles that are not loaded in the orientations indicated by the arrangement information can be corrected by the loading operation unit to the orientations indicated by the arrangement information based on detection information obtained by the detection unit, and if the control unit determines in the second determination process that the remaining articles are loadable, the control unit controls the loading operation unit in the second loading control to load the remaining articles onto the first supporting member according to the arrangement information after correcting the orientations of the target articles that are not loaded in the orientations indicated by the arrangement information.

With this configuration, if it is possible for the loading operation unit to correct the orientations of target articles that are not loaded according to the arrangement information to the orientations indicted by the arrangement information by, for example, supporting and moving the target articles, it is determined in the second determination process that the remaining articles are loadable.

Even if the target articles are not loaded onto the first supporting member according to the arrangement indicated by the arrangement information due to, for example, a target article on the first supporting member falling down midway through the loading of the target articles onto the first supporting member according to the arrangement information, the loading operation unit corrects the orientations of the target articles to the orientations indicated by the arrangement information, and thus all of the plurality of target articles can be loaded onto the first supporting member according to the arrangement information.

It is also preferable that the first supporting member is formed so as to have a box shape with an open upper face.

With this configuration, due to side wall portions standing upright on the supporting portion, it is possible to prevent an article from falling off from the first supporting member when the article is loaded onto the supporting portion that constitutes the bottom surface of the second supporting member.

It is also preferable that the article loading facility also includes a notification unit that notifies of an abnormality, wherein, in the second loading control, the loading operation unit is stopped and the notification unit is activated if the remaining articles are determined as being unloadable in the second determination process.

With this configuration, if the control unit determines that the remaining articles are unloadable, i.e., the remaining articles cannot be loaded onto the first supporting member, the loading of the target articles onto the first supporting member is interrupted, and the notification unit operate. As the notification unit operates, the operator can be notified of the interruption of the loading of the target articles onto the first supporting member, and can take a measure such as stacking the target articles that have been loaded onto the first supporting member again according to the arrangement indicated by the arrangement information.

What is claimed is:

1. An article loading facility comprising:
   a loading operation unit configured to load a plurality of target articles onto one first supporting member; and
   a control unit configured to control the loading operation unit,
   wherein the control unit is configured to perform a first loading control to control the loading operation unit so that the plurality of target articles are loaded onto the first supporting member according to arrangement information that indicates the orientation and the position of each of the plurality of target articles on the first supporting member,
   wherein the loading operation unit is configured to take out a target article that is supported by a second supporting member, and to load the target article onto the first supporting member,
   the article loading facility further comprises: a detection unit configured to detect the positions and the orientations of the target articles that are supported by the first supporting member, relative to the first supporting member; and a determination unit configured to perform a first determination process while the first loading control is performed, to determine whether or not the target articles are in a different state in which the articles are not loaded onto the first supporting member according to the arrangement indicated by the arrangement information, based on detection information obtained by the detection unit,
   wherein the determination unit is configured to execute the first determination process each time a target article is loaded onto the first supporting member,
   wherein if the target articles are determined as being in the different state in the first determination process, articles that are not loaded on the first supporting member, out of the target articles, are remaining articles,
   wherein the control unit is configured to repeatedly perform the first loading control after the first loading control has been completed if the determination unit has not determined in the first determination process that the target articles are in the different state, wherein the control unit is configured to perform a second loading control instead of the first loading control, if the determination unit determines in the first determination process, while performing the first loading control, that the target articles are in the different state, and wherein the second loading control is a control configured to be performed by the control unit to execute a second determination process based on at least one of: the arrangement information; detection information obtained by the detection unit; and information regarding a loading area of the first supporting member in which articles are loadable, to determine whether or not the remaining articles are loadable onto the first supporting member, and to control the loading operation unit to load the remaining articles onto the first supporting member if the remaining articles are determined as being loadable in the second determination process.

2. The article loading facility according to claim 1, wherein, in the second determination process, the control unit is configured to determine whether or not the remaining articles are loadable onto the first supporting member by determining whether or not the number of remaining articles is no greater than a preset number, based on the arrangement information and detection information obtained by the detection unit.

3. The article loading facility according to claim 1, wherein, in the second determination process, the control unit is configured to determine that the remaining articles are loadable onto the first supporting member if the orientations of the target articles that are not loaded in the orientations indicated by the arrangement information can be corrected by the loading operation unit to the orientations indicated by the arrangement information based on detection information obtained by the detection unit, and wherein if the control unit determines in the second determination process that the remaining articles are loadable, the control unit is configured to control the loading operation unit in the second loading control to load the remaining articles onto the first supporting member according to the arrangement information after correcting the orientations of the target articles that are not loaded in the orientations indicated by the arrangement information.

4. The article loading facility according to claim 1, wherein the first supporting member is formed so as to have a box shape with an open upper face.

5. The article loading facility according to claim 1, further comprising:

a notification unit configured to notify of an abnormality, wherein, in the second loading control, the loading operation unit is stopped and the notification unit is activated if the remaining articles are determined as being unloadable in the second determination process.

6. The article loading facility according to claim 1, wherein, in the second loading control, if the remaining articles have been determined as being loadable in the second determination process, the loading operation unit is configured to be controlled so that the remaining articles are loaded onto the first supporting member, with the arrangement of the target articles on the first supporting member remaining different from the arrangement indicated by the arrangement information.

7. The article loading facility according to claim 6, wherein the control unit is configured, in the second loading control, to detect a loadable surface onto which the remaining articles are loadable, from among an upper surface of the first supporting member and upper surfaces of the target articles that are loaded onto the first supporting member, and to create a new loading pattern for loading the remaining articles onto the loadable surface, and wherein the control unit is configured, in the second loading control, to control the loading operation unit so that the remaining articles are loaded onto the first supporting member according to the created new loading pattern.

8. The article loading facility according to claim 1, wherein:

an external shape of each article is a rectangular parallelepiped shape, the arrangement information indicates an arrangement in which articles are stacked in one or more tiers in a vertical direction, and in the second determination process, the control unit is configured to determine that the remaining articles are loadable onto the first supporting member if all of the remaining articles are loadable onto the first supporting member without exceeding an uppermost height in the loading area.

9. The article loading facility according to claim 8, wherein, in the second determination process, the control unit is configured to determine that all of the remaining articles are loadable without exceeding the uppermost height in the loading area and the remaining articles are loadable onto the first supporting member if the proportion of a total volume of the target articles to a volume of the loading area is no greater than a preset proportion, based on the arrangement information and the volume of the loading area.

10. The article loading facility according to claim 8, wherein, in the second determination process, the control unit is configured to detect a loadable surface onto which the remaining articles are loadable, from among an upper surface of the first supporting member and upper surfaces of the target articles that are loaded onto the first supporting member, based on detection information obtained by the detection unit, wherein if the remaining articles do not exceed the uppermost height of the first supporting member when it is assumed that the remaining articles are loaded onto the loadable surface, the control unit is configured to determine that all of the remaining articles are loadable without exceeding the uppermost height in the loading area, and the remaining articles are loadable onto the first supporting member.

* * * * *